United States Patent

Ducret et al.

[15] 3,691,282
[45] Sept. 12, 1972

[54] METHOD FOR DESTROYING NEMATODES

[72] Inventors: Jacques Ducret; Daniel Pillon, both of Lyon; Daniel Demozay, Villeurbanne, all of France

[73] Assignee: PEPRO, Societe pour Le Developpement et La Vente de Specialties Chimiques, Lyon, France

[22] Filed: Nov. 19, 1970

[21] Appl. No.: 91,162

[30] Foreign Application Priority Data

Nov. 26, 1969 France......................6940677

[52] U.S. Cl..................................424/200
[51] Int. Cl.................................A01n 9/36
[58] Field of Search............................424/200

[56] References Cited

UNITED STATES PATENTS 2,754,302  7/1956  Gysin et al..................424/200

FOREIGN PATENTS OR APPLICATIONS 1,063,067  4/1954  France
1,105,254  11/1955  France
1,466,120  1/1967  France

*Primary Examiner*—Albert T. Meyers
*Assistant Examiner*—Leonard Schenkman
*Attorney*—Browdy and Neimark

[57]  ABSTRACT

0-0-diethyl-0-3-pyridyl thiophosphate is used as a nematocide.

2 Claims, No Drawings

METHOD FOR DESTROYING NEMATODES

The present invention relates to antiparasitic compositions adapted to be used for fighting against the crop-infesting nematodes.

More particularly, it relates to nematocide compositions wherein the active material is a phosphorus-containing derivative of pyridine having the general formula

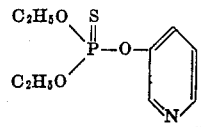

that is, 0-0-diethyl-0-3-pyridyl thiophosphate, hereinafter referred to as TDEP.

Destroying phytoparasitic nematodes is at present one of the main problems in agriculture. As a matter of fact, the damage wrought by such parasites is very substantial in most of the vegetable, flower, fruit crops and vineyards, wherein they bring about losses in yield, which are often very heavy, and produce damage up to the complete destruction of crops in some cases.

Among the most important kinds of parasite nematodes, Meloidogyne, Pratylenchus, Xiphinema, Heterodera, Ditylenchus, etc. may be mentioned in particular.

TDEP has been known for many years, since it is described in the French Pat. No. 1,063,067, filed in France on 19th April, 1952.

In this patent, it is pointed out that TDEP, like all the other products described therein, has advantageous insecticidal and acaricidal properties.

TDEP is likewise mentioned in the French Pat. No. 1,105,254 (Example 3) and the toxic and insecticidal properties thereof are pointed out (action on Aphis).

The known insecticidal properties of said compound, however, do not imply that TDEP would also possess outstanding nematocidal properties. Furthermore, the chemically related compounds listed in the above-mentioned Patents do not possess said properties by any means.

As a matter of fact, nematodes are a class apart in the range of phytoparasitic organisms, as they are neither insects nor microbes, and for the destruction thereof it is necessary to use duly specific chemical compounds, called "nematocides," which are generally usable for this particular application only, and normally have little, if any, insecticidal properties.

Conversely, it may be noted that most of the insecticides have little, if any, nematicidal action. Thus, for instance, such well known insecticides as Aldrine, H.C.H., Deldrine, Heptachlorine, have no nematicidal action at all.

As mentioned in the above-mentioned patents, TDEP can be prepared by allowing the chloride of diethylthionophosphoric acid to react with the sodium salt of hydroxy-3-pyridine in an alcoholic medium, such mixture being refluxed for 1 hour.

9.5g (0.1 mole) of hydroxy-3-pyridine are dissolved in 70ml of absolute alcohol, and a 10 percent solution of sodium ethylate (0.1 mole) is poured into the absolute alcohol. The reaction is allowed to proceed at room temperature, with stirring, for 30 minutes.

Diethylchlorothionophosphate (18.8g or 0.1 mole) is then added, and the mixture is refluxed for 1 hour. The sodium chloride is then filtered off, the alcohol is removed under vacuum, and the oily residue is recovered with chloroform.

The chloroform solution is washed with 5 percent sodium bicarbonate, and then with distilled water. The organic solution is dried over MgSO$_4$. After filtration, the solvent is distilled under the vacuum of a water pump and, then, for 1 hour, under high vacuum (0.1mm Hg at 50° C). The resulting product appears as a light yellow oil, the index of refraction of which is $n_D^{20}$ : 1.5130.

Yield: 90 percent.

Results of centesimal analysis:

|  | C, % | H, % | N, % | P, % |
|---|---|---|---|---|
| Calculated: | 43.72 | 5.66 | 5.66 | 12.55 |
| Found: | 43.77 | 5.93 | 5.87 | 13.11 |

The nematocidal activity of TDEP was brought out by many tests, wherein it was compared with some of the homologues described in the above-mentioned Patents, on the one hand, and with the most important commercial nematocides, on the other hand, said commercial nematocides being:

the mixture of Dichloropropene and Dichloropropane (D, D),
Dibromochloropropane (Nemagon),
Tetrachlorothiophene,
0,0-diethyl- and 0-pyrazin thiophosphate (Thionazin),
S-methyl-N(methylcarbamoyl)oxy-thiocetimidate (Metomyl),
Ethylene dibromide.

The high nematicidal efficiency of the product according to the invention (as compared with already known products) is shown by the following examples:

EXAMPLE 1

10ml of a solution of the product to be tested are placed in a 250ml screw cap powder box, and then 3 or 4 drops of a concentrated suspension of 4 days old nematodes (*Coenorhabditis elegans*) are added. After 48 hours, checks are effected by means of a binocular magnifying lens, with determination of the death rate.

The results appearing in the Table below indicate the percentage of nematodes destroyed at the time of the checking. For the sake of clarity, the products tested are represented by a letter, to wit:

Product according to the invention:
TDEP

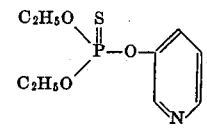

Known product "A"

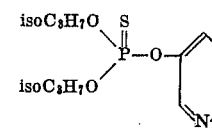

Known product "B"

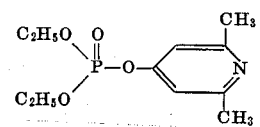

Known product "C"

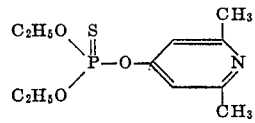

Known product "D"

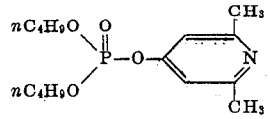

| Active material: | Proportion used: | | |
|---|---|---|---|
| | 0,1 g/l | 0,01 g/l | 0,001 g/l |
| TDEP | 100% | 100% | 100% |
| Known product "A" | 80% | 0% | 0% |
| Known product "B" | 100% | 50% | 30% |
| Known product "C" | 100% | 25% | 0% |
| Known product "D" | 100% | 80% | 40% |
| Mixture: Dichloropropene + Dichloropropane | 100% | 0% | 0% |
| Dibromochloropropane | 40% | 0% | 0% |
| Ethylene dibromide | 100% | 0% | 0% |
| Thionazin | 100% | 80% | 0% |

EXAMPLE 2

A soil infested with *Meloidogyne incognita* was prepared. It was then treated with a solution of the product to be tested, and aerated for three weeks, after which it was sown with cucumber seeds (*Cucumis Sativus*).

The activity of the product tested was checked three weeks after said sowing operation: to this end, the roots were washed, and a mark from 0 to 5 was given, depending on the presence of the galls typical of the attack by nematodes (the "0" mark corresponds to a complete absence of galls, while the "5" mark corresponds to the untreated pilot, which was infested with galls).

| Active Material: | Proportions used, kg per hectare | | | |
|---|---|---|---|---|
| | 50 | 20 | 10 | 5 |
| TDEP | 0 | 0 | 0 | 0 |
| Known product "A" | 4.5 | 5 | 5 | 5 |
| Known product "B" | 5 | 5 | 5 | 5 |
| Known product "C" | 4.5 | 5 | 5 | 5 |
| Known product "D" | 4.5 | 5 | 5 | 5 |
| Mixture: Dichloropropene + Dichloropropane | 4.5 | 5 | 5 | 5 |
| Dibromochloroethane | 4.6 | 5 | 5 | 5 |
| Tetrachlorothiophene | 2.2 | 5 | 5 | 5 |
| Thionazin | 0.2 | 0.8 | 1 | 2.6 |
| Methomyl | 0.1 | 0.2 | 1 | 2.4 |

EXAMPLE 3

The test described in Example 2 was repeated, again with *Meloidogyne incognita*, but cucumber seeds were sown immediately after treating the soil with the active material.

This test, which was intended to bring out a contingent phytotoxicity of TDEP, made it possible to ascertain that the cucumber growth had proceeded absolutely normally, that is, that TDEP, even under very hard test conditions (the seeds being in direct contact with the active material), presents no risk of phytotoxicity. Its nematocidal action was likewise complete at all the proportions used.

EXAMPLE 4 — OPEN AIR TESTS

Granules containing 2.5 percent of active material were spread over soils infested with various species of nematodes. Said granules (size, 30/60) were incorporated with the soils only superficially. Immediately afterwards, the plots of soils were sown with seeds of the corresponding plants, as indicated hereinafter.

When gathering the crops, checks were made to determine the efficiency of the nematocidal products tested. A mark was given to each product, which mark ranged from 0 (untreated pilot plot) to 10 (crop in perfect condition), while taking into account the vegetation appearance, the yield of the crop, the presence or the absence of galls or cysts on the roots, and the presence or the absence of plant-eating nematodes, the latter being picked out in the laboratory.

Test on *Meloidogyne hapla* in a plot sown with carrots (*Daucus carota*). The following Table shows the efficiency of the compound according to the invention (TDEP) as compared with the mixture of dichloropropene and dichloropropane (DD), depending on the amount of active material per hectare:

| | Active material, kg/hectare | Efficiency mark |
|---|---|---|
| TDEP | 1 | 7 |
| TDEP | 2.5 | 10 |
| TDEP | 5 | 10 |
| DD | 400 | 9 |

Test on *Meloidogyne hapla* in a plot sown with black salsify (*Scorzonera sp.*). The following Table shows the efficiency of the compound according to the invention (TDEP), as compared with the mixture of dichloropropene and dichloropropane (DD), depending on the amount of active material per hectare.

| | Active material, kg/hectare | Efficiency mark |
|---|---|---|
| TDEP | 7 | 7 |
| TDEP | 2.5 | 9 |
| TDEP | 5 | 10 |
| DD | 300 | 9 |

Test on *Heterodera avenae* in a plot sown with oats (*Avena sativa*). The following Table shows the efficiency of the compound according to the invention (TDEP), as compared with the mixture of dichloropropene with dichloropropane (DD), depending on the amount of active material per hectare:

| | Active material, kg/hectare | Efficiency mark |
|---|---|---|
| TDEP | 1 | 7 |
| TDEP | 2.5 | 9 |
| TDEP | 5 | 10 |
| DD | 300 | 9 |

Test on *Ditylenchus dipsaci* in a plot sown with barley (*Hordeum vulgare*). The following Table shows the efficiency of the compound according to the invention (TDEP), depending on the amount of active material per hectare:

| | Active material, kg/hectare | Efficiency mark |
|---|---|---|
| TDEP | 0.5 | 2 |
| TDEP | 1 | 6.5 |
| TDEP | 2.5 | 10 |

The results of the above tests bring out the two essential characteristics of the present invention, to wit:
- the unexpected character of the nematocidal properties of TDEP, as compared with the absence (cf. Example 2) of said properties in chemically related compounds (A – B – C – D), on the one hand;
- the important technical advance provided by the compound of the invention by reason of the superior action thereof, as compared with the action of the most important commercial nematicide products, on the other hand.

The nematodes mentioned in the above examples only represent the most typical genera of said family of parasites, and should not be considered as limiting the invention. Among the nematodes sensitive to the compound of the invention, one may also mention: ditylenchus, Tylenchorhynchus, Dolichodorus, Hoplolaimus, Rotylenchus, Belonolaimus, Pratylenchus, Radopholus, Heterodera, Meloidogyne, Tylenchulus, Paratylenchus, Dorylaimus, Xiphinema, Longidorus, Trichodorus, Aphilenchoides.

In practical use, the compound according to the invention is applied in a sufficient amount for producing the desired action. Such adequate quantity depends, however, on the many conditions encountered, namely, nature of the soil, time of the year, moisture, temperature, nature of the parasitism, extent of infestation, and the like. Broadly, amounts ranging from 1 to 50 kg per hectare are sufficient for an efficient nematocide action.

3-pyridyl diethyl-thiophosphate can be used in formulations such as those generally devised for practical use. In particular, it can be used in the pure state or as a solution adapted to be emulsified in conventional organic solvents, and containing from 50 percent to 99 percent of active material, to which solution the adjuvant or adjuvants conventionally used for this type of formulations will be added. It can also be used as granules produced by pouring or spraying the active material onto inert carriers, such as sands.

The compound according to the invention can also be used alone, or admixed with other insecticides or nematocides, such as Lindane, D.D.T., Chlorthiepin, Fonophos, Chlorfen-Venphos, Dibromochloropropane, Dibromochloropropene, or a mixture of Dichloropropene + Dichloropropane, Chloropicrine, methyl bromide, ethylene dibromide, metal carbamates or thiocarbamates (such as, for instance, Metamsodium), or aryl carbamates, phosphoric esters (such as, for instance, Thionazin), acetimidates (such as, for instance, Acetomyl), or any other product likely to enlarge or reinforce its field of action and to achieve thus a more complete destruction of the parasitism concerned.

What we claim is:

1. A method for destroying phytoparasitic nematodes comprising applying to the phytoparasitic nematode a nematocidal amount of 0-0-diethyl-0-3-pyridyl thiophosphate.

2. The method of claim 1 wherein said applying step is accomplished by applying said compound to soil infested with said phytoparasite nematodes at the rate of about 1 to about 50 kg. per hectare of area to be treated.

* * * * *